Sept. 13, 1966  LE ROY H. EASTON  3,273,002
ELECTRIC MOTOR
Filed Oct. 14, 1963
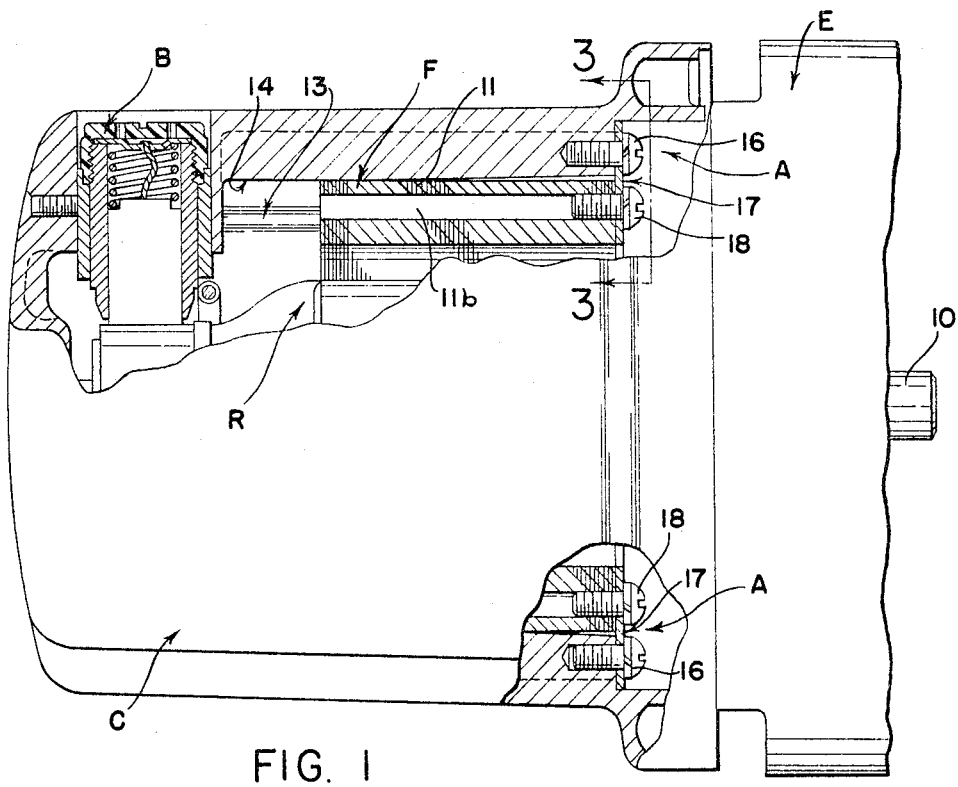
FIG. 1
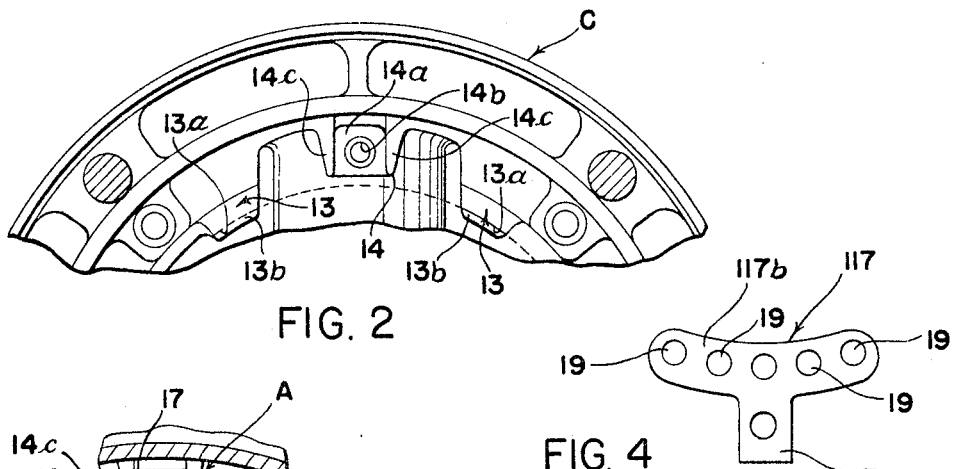
FIG. 2
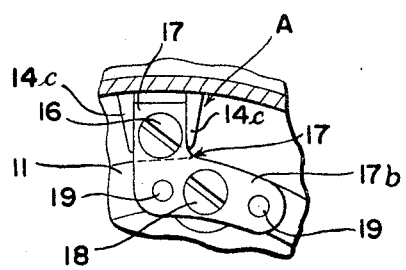
FIG. 3
FIG. 4
INVENTOR.
LE ROY H. EASTON
BY Philip D. Golrick
ATTORNEY

United States Patent Office 3,273,002
Patented Sept. 13, 1966

3,273,002
ELECTRIC MOTOR
Le Roy H. Easton, Cuyahoga Falls, Ohio, assignor to Ametek, Inc., New York, N.Y., a corporation of Delaware
Filed Oct. 14, 1963, Ser. No. 315,752
7 Claims. (Cl. 310—191)

The present invention relates generally to a commutating dynamo electric machine, and more particularly to an improved structure in a commutating electric motor whereby the field or stator core is so mounted in the motor casing as to permit a certain selection of rotational positions relative to the casing and therefore relative to brushes fixed in position relative to the casing.

Though described with reference to a motor, it is to be noted that at times the invention may be advantageously used also in the other commutating dynamo electric machines.

In commutating electric motors, the often desirable adjustability of relative brush-field core positions, that is, of the brush and field pole axes, has been provided in the prior art by use of brush mounting means rotationally adjustable relative to a motor casing and hence to the field or stator core structure non-rotationally secured in the casing; or in cases where the brushes are non-adjustably mounted in the casing, by so securing the field or stator core that it may be rotationally adjusted relative to the casing and thereby to the brushes. A simple structure providing at least a limited adjustability of the latter type is the subject matter of the present invention.

In accordance with the present invention, a motor casing or housing adapted to receive the field or stator structure has seating surfaces engaging the field core stack endwise at one end and longitudinally on at least limited circumferential areas, to locate the stack axially and coaxially in the casing; the casing and core having engaging complementary arcuate surfaces coaxial with the motor axis permitting at least a limited angular shift of the stator in the casing. At its other end the core is secured by a plurality of angularly spaced anchoring elements or clamps; each in the disclosed specific embodiment being fixed in a suitable seat on the casing and having overhanging the other end of the stator core a clamp portion provided with a series of spaced apertures in a selected one of which and a corresponding aperture of the core a screw or pin may be engaged.

Such clamping or anchoring elements in conjunction with the cooperating stator and stator seating surface locate and secure the stator in rotational as well as axial and coaxial sense; yet afford a selectable angular orientation relative to the casing, and thereby to the axis of brushes secured on the casing.

This simple structure, hereinafter described in detail in one specific embodiment of the invention, is enclosed completely in the assembled casing so that the relative brush axis-field axis positioning may not be readily tampered with. Also there is avoided in the structure hereinafter described the higher fabrication cost, and at times awkwardness in assembly, of other known types of adjustable field construction; for example where bolts passed entirely through the stator core or stack are each threaded into a selected one of a series of drilled and tapped bosses in an end region of the casing.

The general object of the present invention is then to provide an improved construction in a commutating dynamo electric machine such as an electric motor, affording at least a limited adjustability of the field core relative to the casing and thereby to the brush axis. Another object of the present invention is to provide an adjustable field mounting structure of the character described which is relatively inexpensive, and simple in design and in assembly. Other objects and advantages of the present invention will appear from the following description and the drawings wherein:

FIG. 1 is a side view of the motor embodying the present invention, with certain portions broken away for clarity of representation;

FIG. 2 is a fragmentary detail end view of the motor casing showing certain seat areas pertaining to the invention;

FIG. 3 is a fragmentary detail view of a clamping element in position; and

FIG. 4 shows an alternate form of a clamp or anchor element.

In the drawings, a commutating motor embodying the present invention is shown as including as principal elements a primary casing member C, a field or stator structure F received and seated therein, a pair of brush holder assemblies such as B secured in diametrically opposed positions in the casing, an end bracket E secured by suitable bolts or screws (not shown) on the open right end of the primary casing member C, an armature or rotor R with shaft 10 supported by suitable bearings (not shown) in the closed or integral left end of the primary casing member C and in the end bracket casing member E beyond which or through which projects the rotor shaft 10; and also anchor or clamping means for the field or stator stack designated by the general reference character A.

The stack of iron laminations comprising the field or stator core 11 has either a completely cylindrical exterior periphery, or at least has those areas engaged by the casing as portions of a cylindrical surface coaxial with the motor axis. The casing member C has corresponding complementary arcuate portions on its interior, whereby, when not clamped in the manner hereinafter described, the field may be rotated at least to a limited extent relative to the casing; and also has suitable radial shoulder means to engage the inner or commutator-adjacent left end of the field core held thereagainst by the clamping means A.

In the specific casing form here shown, the roughly cylindrical main portion of the primary casing element C on its interior is provided with two pairs of diametrically opposed integral longitudinal ribs 13, the four ribs here being equispaced at 90° locations and each having its inward face machined to provide an arcuate surface 13a coaxial with the motor and complementary with arcuate exterior portions of the stator core fitted therebetween. The surface 13a on each rib runs inwardly from the right end of the rib (as represented in FIG. 1) to terminate in a radical shoulder 13b engaging the left end radial face of the stator core.

As shown more clearly in FIG. 2, as part of the anchoring means A, spaced angularly midway between adjacent ribs, here in the longitudinal plane through the brush axis, there is a further pair of diametrically disposed integral longitudinal ribs 14 terminating at the right in respective seat formations for anchor elements or clamps 17. Each clamp seat includes a flat portion 14a slightly below the plane of the right end of the stator core stack as seated by the above described surfaces 13a and 13b; and a longitudinal inwardly extending threaded aperture 14b for receiving a clamp-securing screw 16 between the opposed parallel endwise projecting lugs or ridges 14c. At each clamping location, the core has engaged therein a pin-like element projecting slightly beyond its right end surface, here provided by a respective screw 18 in a bore 11b, for purposes to be described.

The anchoring means A, in addition to the clamp seat provided by 14a, 14b, 14c, further includes the clamping element 17 which may have, for example, the roughly L-shaped or the roughly T-shaped forms of FIG. 3 or FIG. 4 respectively, spanning adjacent portions of the core and casing. The element 17 is a stamped plate or the like having a radial arm 17a perforated to be secured on the seat by the screw 16 with its cooperating lock washer to apply axial clamping pressure to the core through the elongated arm 17b overlapping the adjacent portion of the right end of the stator stack; arm 17b, for selected angular positioning of the core, having a plurality of perforations 19 spaced along an arc coaxial with the motor axis, through a selected one of which may be threaded the self-tapping or similar type of screw 18 projecting into a longitudinal aperture or bore 11b in the core; thereby to secure the stator stack in axial and in selected angular position.

For the L-shaped clamp form of FIG. 3 in the orientation there shown, three different positions of the field relative to the casing are thus immediately available, and further since the clamp element 17 may be reversed in orientation with the arm 17b directed to the left, five positions in all are possible with three perforations 19, the first perforation at the apex in either orientation defining but one possible field position inasmuch as that perforation occurs on the centerline of the radial arm 17a.

With the T-shaped form, symmetrical about a radial centerline of the radial arm portion 117a and having as shown a series of five perforations in the portion 117b overhanging the end of the stator core, five selectable positions are available without need of inverting or changing the clamp securement relative to the casing.

Generally the clamping arrangements including the disclosed forms of clamp plates are far preferable to the alternative of having a series of selectable screw-receiving apertures in the core or casing for obvious reasons.

It should also be noted that the core seating arrangement with spaced longitudinally extending seating surfaces provided by the ribs and terminating in the end seating shoulders of the ribs also affords motor ventilating air passages between the ribs, core and casing.

I claim:

1. In a commutating dynamo electric machine, including a casing member adapted to receive through one end a field having a field core member, field seating and securing structure comprising:

said casing member having near its other end shoulder means adapted to engage endwise a corresponding first end of said core member and also having interior surface portions adapted to engage the core member on peripheral portions;

said shoulder means and surface portions forming a core seat;

said field core member having external arcuate portions engaged by said surface portions of the casing member whereby the core may be shifted rotationally about a shaft axis of the machine at least through a limited angle relative to the said casing member and to brushes mounted thereon; and core clamping means including at each of a plurality of angularly spaced positions a respective clamp member spanning and secured to adjacent end portions of the casing member and of the other end of the core member, and means securing the clamp member to the casing member and core member, the last said means including a series of angularly spaced apertures in one of said members for selectively receiving a clamping screw engaged in an aperture of another of said members, said apertures being spaced along an arc coaxial with said axis.

2. The structure as described in claim 1, wherein each said clamp member comprises a plate having apertured portions bearing on an apertured screw receiving end portion of said core member and on an apertured screw-receiving end portion of said casing member respectively, said series of apertures provided by perforations in one of said plate portions.

3. The structure as described in claim 2, wherein the other of said plate portions is embraced by ridge formations projecting from the thereunder-lying one of said casing and core members.

4. The structure as described in claim 1, wherein each said clamp member comprises a plate having a radially extending perforated arm portion secured on a seat formation provided on the respective end portion of the casing member spanned by the plate as a said clamp member, and a portion overlapping an adjacent end portion of the core member and having perforations as said series of apertures, said overlapping portion securing the core member against rotation by a pin-like element engaged in a selected perforation and in the core;

said arm portion embraced by projecting ridge formations in the said seat formation to support the plate edgewise against displacement.

5. The structure as described in claim 4, wherein said casing member includes a plurality of angularly spaced longitudinally extending internal ribs with surfaces formed coaxial with the axis of the machine and terminating in radial inward shoulders to provide said shoulder means and interior surface portions as said core seat, and defining between said casing and core members longitudinal ventilating air passages.

6. In a commutating electric motor including a casing member adapted to receive through one end a field having a core member, field seating and securing structure comprising:

said casing member having near its other end shoulders means adapted to engage endwise a corresponding first end of said core member and also having a plurality of angularly spaced longitudinal ribs each with arcuate interior surface portions coaxial with the motor axis adapted to engage the core member on peripheral portions;

said shoulder means and surface portions forming a core seat;

said field core member having external arcuate portions with curvature complementary to said surface portions of the ribs whereby the core may be shifted at least through a limited angle relative to the said casing member; and core clamping means including at each of a plurality of angularly spaced positions a respective clamp plate spanning and secured endwise to adjacent portions of the casing member and of the other end of said core member, said plate member including a series of angularly spaced apertures for selectively receiving a securing screw engaged in an underlying aperture of the core member, and also including a perforated radial arm portion secured by a screw through its perforation threaded into a respective arm-embracing seat formation on said casing member.

7. The structure described in claim 6, wherein the seated core member projects sufficiently above the adjacent portions of the casing member to which the respective clamping plates are secured for development of an endwise core-clamping force by each said screw threaded into an arm-embracing seat portion bearing upon a respective said radial arm portion.

References Cited by the Examiner

UNITED STATES PATENTS 3,114,852  12/1963  Cook _____ 310—191

MILTON O. HIRSHFIELD, *Primary Examiner.*

ORIS L. RADER, *Examiner.*

L. L. SMITH, *Assistant Examiner.*